United States Patent Office 3,310,573
Patented Mar. 21, 1967

3,310,573
DIARYL FLUORO COMPOUNDS
David Gordon Coe, Mendenhall, Pa., assignor to E. I.
du Pont de Nemours and Company, Wilmington, Del.,
a corporation of Delaware
No Drawing. Filed June 17, 1963, Ser. No. 288,539
4 Claims. (Cl. 260—346.3)

This invention is directed to novel organic compounds which compounds may be utilized, as hereinafter described, in the preparation of dyes and/or polyamide polymers.

The compounds of this invention may be prepared by two general methods. Condensation of two moles of an aromatic hydrocarbon with a fluoroketone in the presence of hydrogen fluoride or by condensing two moles of an aromatic amine with a fluoroketone in the presence of aluminum chloride. The resulting products may then be further modified and converted to useful compounds by subsequent standard reactions such as halogenation, oxidation, nitration, and reduction, etc.

As examples of aromatic hydrocarbons suitable for undergoing this reaction are toluene and xylene which can be condensed with fluoroketones in the presence of hydrogen fluoride at temperatures of from 100–200° C. The products of the reactions can then be nitrated and reduced to give valuable amines or can be oxidized to give carboxylic acids.

Aniline may be condensed with fluoroketones using aluminum chloride as a catalyst at an elevated temperature in the vicinity of 250° C. As a further extension of this reaction, one mole of aniline may be condensed with fluoroketone to give an α,α-fluoroalkyl substituted aminobenzyl alcohol as has been described by Knunyants et al. (Bull. ACAD, SCI (U.S.S.R.) Div. Chem. Sci. English Trans. 1962, page 636). These compounds may then be further condensed with a second mole of aniline to give the desired fluorinated dianiline.

Examples of fluorinated ketones that are suitable for use in this process include hexafluoroacetone, pentafluoromonochloroacetone and dichlorotetrafluoroacetone. These fluorinated ketones may be prepared by a variety of techniques such as halogen exchange with the perchloroketone as is described in U.S. Patent 2,853,524 or by the condensation of fluorinated esters in the presence of sodium as described by M. Hauptschein and R. A. Braun, J. Am. Chem. Soc., 77, 4930 (1955). Hexafluoroacetone may be prepared by the oxidation of perfluoroisobutylene as is described by T. J. Brice, et al., J. Am. Chem. Soc., 75, 2698 (1953). Other methods for the preparation of fluorinated ketones are described on pages 180ff in "Aliphatic Fluorine Chemistry," by A. M. Lovelace, W. Postelnek and D. A. Rausch, A.C.S. Monograph, No. 138, Copyright 1958.

It is, therefore, an object of this invention to provide novel organic compounds for the purposes aforementioned, said compounds representing a novel contribution to the art.

These and other objects will become apparent in the following description and claims.

More specifically, the present invention is directed to novel diaryl fluoro compounds having the structure:

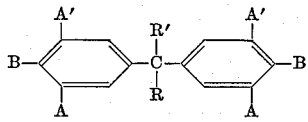

wherein R and R' have the formula $CCl_mF_{3-m}$, $m$ is 0 to 1, said A is selected from the group consisting of H, Cl, Br, $NO_2$ and $NH_2$ with the proviso that A may be COOH when said B is COOH; said A' is selected from the group consisting of H, Cl and Br and said B is NHP, said P is selected from the group consisting of H, $C_nH_{2n+1}$ and $C_2H_4CN$, $n$ being 1 or 2, with the proviso that when said A is $NH_2$, and B is selected from the group consisting of $NH_2$, $CH_3$ and COOH.

Specific novel diaryl fluoro compounds within the scope of the present invention include the following:

4,4'-(hexafluoroisopropylidene)-dianiline
4,4'-(hexafluoroisopropylidene)-bis(2,6-dibromoaniline)
4,4'-(hexafluoroisopropylidene)-bis(2-nitroaniline)
4,4'-(hexafluoroisopropylidene)-bis(o-phenylene diamine)
4,4'-(hexafluoroisopropylidene)-bis(2-aminotoluene)
4,4'-(hexafluoroisopropylidene)-bis(2-aminobenzoic acid)
4,4'-(hexafluoroisopropylidene)-bis(phthalic anhydride)
4,4'-(hexafluoroisopropylidene)-bis(2,6-dichloroaniline)
4,4'-(hexafluoroisopropylidene)-bis(N-methylaniline)
4,4'-(hexafluoroisopropylidene)-bis(N-ethylaniline)
4,4'-(hexafluoroisopropylidene)-bis(N-2-cyanoethylaniline)
4,4'-(hexafluoroisopropylidene)-bis(2-nitrobenzoic acid)
4,4'-(hexafluoroisopropylidene)-bis(2-nitro-6-chloroaniline)
4,4'-(chloropentafluoroisopropylidene)dianiline
4,4'-(chloropentafluoroisopropylidene)-bis(2,6-dibromoaniline)
4,4'-(chloropentafluoroisopropylidene)-bis(N,2-cyanoethylaniline)
4,4'-(chloropentafluoroisopropylidene)-bis(2-aminotoluene)
4,4'-(1,3-dichlorotetrafluoroisopropylidene)dianiline
4,4'-(1,3-dichlorotetrafluoroisopropylidene)-bis(2-aminotoluene)

Representative examples illustrating the present invention follow. Unless otherwise designated, parts mentioned are by weight and temperatures are in degrees centigrade.

EXAMPLE I 4,4'-(s-dichlorotetrafluoroisopropylidene)ditoluene

To a clean, dry Hastelloy C bomb having a capacity of 400 ml. are charged 68 parts toluene, 67 parts s-dichlorotetrafluoroacetone and 170 parts hydrogen fluoride, followed by sealing and heating said bomb at 110° C. for 16 hours. After cooling to 0°, the bomb is vented, opened and the contents discharged onto 500 parts ice in a stainless steel beaker. The upper layer of aqueous hydrogen fluoride is cautiously decanted from the crude product which is then washed several times with water by decantation. The product is dissolved in petroleum ether (30–60° C. B.P.) and washed once with 100 parts 6% aqueous caustic soda. The petroleum solution is dried and distilled to yield 4,4'-(dichlorotetrafluoroisopropylidene)ditoluene having a B.P. of 120°–122° C./ 0.1 mm. and a M.P. of 129° C. after three recrystallizations from pentane.

Analysis.—Calcd. for $C_{17}H_{14}Cl_2F_4$: C, 55.9; H, 3.9; Cl, 19.4; F, 20.7. Found: C, 56.1; H, 3.8; Cl, 19.2; F, 21.5.

In a similar manner, hexafluoroacetone can be condensed with o-xylene to give 4,4'-(hexafluoroisopropylidene)-bis(o-xylene).

Similarly, 64 parts of toluene may be condensed with hexafluoroacetone in hydrogen fluoride by heating to 160° C. for 14 hours under autogenous pressure as heretofore described. The petroleum solution is dried and distilled to yield 98 parts 4,4'-(hexafluoroisopropylidene) ditoluene having a B.P. of 110°–112°/.17 mm. The product solidifies and can be recrystallized from petroleum ether to a M.P. 80°–81° C.

Analysis.—Calcd. for $C_{17}H_{14}F_6$: C, 61.4; H, 4.2; F, 34.3. Found: C, 61.4; H, 4.4; F, 34.2.

EXAMPLE II

*4,4'-(hexafluoroisopropylidene)-dibenzoic acid*

225 parts of the ditoluene compound are dissolved in 2 liters acetic acid and heated to 80° C. To the solution at 80° C. are added, very cautiously, 500 parts chromium trioxide in portions of 20 parts over 5 hours. After stirring at 80–90° C. overnight, the solution is heated to reflux 2 hours. The acetic acid is stripped off under vacuum until the mixure gets very thick; 1,000 parts of water are added and the solution steam distilled to remove as much of the acetic acid as practical. On cooling, the mixture is filtered and the cake washed with water; retaining the filtrate (A). The filter cake contains most of the product which is dissolved by heating with sodium carbonate solution, then filtered through filter cell and acidified with sulfuric acid to precipitate the dibenzoic acid which is filtered and washed acid free with water, then dried to give 197 g. product, M.P. 269° C. Further product can be obtained from the filtrate (A) by adding sodium carbonate solution to pH 10, filtering and acidfying the filtrate. A slight greenish tint due to residual traces of chromium salts can be removed by conversion to the diacid chloride.

To a slurry of 50 parts of the dibenzoic acid in 205 parts of thionyl chloride are added 2 drops of dimethyl formamide. Hydrogen chloride is evolved quite slowly; after heating at reflux overnight, as much as possible of the thionyl chloride is stripped off; 200 ml. toluene are added and distillation continued till all of the residual thionyl chloride has gone. The solution is filtered from any sediment of chromium salts and distilled through a spinning band column to give 4,4'-(hexafluoroisopropylidene)dibenzoyl chloride B.P. 135–140° C./0.5 mm. which is recrystallized from logroine to yield 45 g., M.P. 98–99° C. The acid chloride may be hydrolyzed by refluxing 2 parts of it in 50 parts methanol containing 5 parts sodium hydroxide for 2 hours; the solution is diluted with 250 parts of water and acidified with dilute hydrochloric acid to give 1.8 parts of the diacid M.P. 269° C.

*Analysis.*—Calcd. for $C_{17}H_{10}F_6O_4$: C, 52.0; H, 2.6; F, 29.1. Found: C, 52.0; H, 2.6; F, 29.1.

In a similar fashion, one can oxidize 4,4'-(s-dichlorotetrafluoroisopropylidene)ditoluene to 4,4' - (s-dichlorotetrafluoroisopropylidene) dibenzoic acid M.P. 274° C.

*Analysis.*—Calcd. for $C_{17}H_{10}F_4Cl_2O_4$: F, 17.9; Cl, 16.7. Found: F, 17.7; Cl, 16.4.

EXAMPLE III

*4,4'-(hexafluoroisopropylidene)dianiline*

A solution of hydrazoic acid in chloroform is prepared by adding dropwise 24.5 parts of chilled concentrated sulfuric acid to a slurry of 32.5 parts of sodium azide in 32.5 parts water and 300 parts of chloroform at 0° C., making sure that the temperature does not rise above 10° C. After all of the sulfuric acid has been added, the chloroform is decanted off and the hydrazoic acid content determined by removing a 5 ml. portion with a pipette, adding it to 50 parts of water and titrating with standardized alkali—the solution is about 1.6 N.

22 parts of 4,4'-(hexafluoroisopropylidene) dibenzoic acid are slurried in a mixture of 88 parts concentrated sulfuric acid and 300 parts chloroform. To the slurry are added 105 ml. of the hydrazoic acid solution (50% excess), while holding the temperature at 40° C., after 30 minutes, the mixture is heated to reflux for 2 hours then allowed to stand overnight before pouring into 1 liter water. The precipitated starting material is filtered off and the chloroform layer separated; the acid solution is then made strongly alkaline with caustic soda and the precipitated 4,4'-(hexafluoroisopropylidene)dianiline filtered off. Recrystallization from benzene with charcoal treatment gives white crystals M.P. 197° C.

*Analysis.*—Calcd. for $C_{15}H_{12}F_6N_2$: F, 34.2; N, 8.4. Found: F, 34.3; N, 8.3.

In a similar fashion 4,4' - (s-dichlorotetrafluoroisopropylidene) dianiline can be obtained from 4,4'-(s-dichlorotetrafluoropropylidene) dibenzoic acid, it has M.P. 126–128° C.

*Analysis.*—Calcd. for $C_{15}H_{12}Cl_2F_4N_2$: Cl, 19.3; N, 7.6. Found: Cl, 18.9; N, 7.3.

This diamine may be alkylated with dimethyl sulfate or other alkylating reagents or reacted with acrylonitrile to obtain the cyanoethylated derivative.

EXAMPLE IV

*4,4'-(hexafluoroisopropylidene)-bis(2,6-dibromoaniline)*

3.34 parts of 4,4'-(hexafluoroisopropylidene)dianiline are dissolved in 100 parts of 0.5 N hydrochloric acid and to it added 6.4 parts of bromine with vigorous agitation. A small further amount of bromine is added dropwise till the water has a permanent brownish tint. The crude tetrabromo compound (6.6 parts) is filtered off and washed with water containing a little of sodium bisulfite. The product is dissolved in diethyl ether, treated with charcoal, filtered and the solution evaporated. The product is then recrystallized from petroleum ether to give faintly colored crystals M.P. 189–191° C.

*Analysis.*—Calcd. for $C_{15}H_8N_2F_6Br_2$: C, 27.7; H, 1.2; N, 4.3; F, 17.6; Br, 49.2. Found: C, 27.7; H, 1.3; N, 4.1; F, 17.9; Br, 48.0.

EXAMPLE V 4,4'-(hexafluoroisopropylidene)dianiline (0.45 part is dissolved in 15 parts of hydrochloric acid (10%) and cooled to 0–5° C. To the solution is added 2.8 parts of 1 N sodium nitrate solution. After standing for 30 minutes at below 10° C., the excess nitrous acid is destroyed with sulphamic acid and 0.56 g. N-2-cyanoethyl N-ethyl m-toluidine added. Potassium acetate is added to pH 3 and the mixture stirred 30 minutes, further potassium acetate is then added to pH 5 and the mixture stirred for 1½ hours. Finally, the pH is raised to 7.5 and the precipitated dye filtered off. It may be purified by chromatography in benzene solution in alumina. It dyes nylon and polyethylene terephthalate yellow shades.

Similarly, one part of dianiline in 15 parts 10% hydrochloric acid is diazotized and coupled on the basic side to 0.56 part phenol in 3 parts of 30% caustic soda and 15 parts water. The resultant dye gives greenish yellow shades on nylon, polyethylene terephthalate and cellulose acetate.

EXAMPLE VI

*4,4'-(hexafluoroisopropylidene)-diacetanilide*

3.4 parts of 4,4'-(hexafluoroisopropylidene)dianiline are dissolved in 25 parts of acetic acid and 10 parts of acetic anhydride added. After standing overnight the mixture is drowned in water and the precipitate filtered off. Recrystallization of the crude product from a mixture of benzene and ethyl alcohol (10:3) gives white crystals of 4,4'-(hexafluoroisopropylidene)-diacetanilide M.P. 239° C.

EXAMPLE VII

*4,4'-(hexafluoroisopropylidene)-bis(2-nitroacetanilide)*

To 2 parts of 4,4'-(hexafluoroisopropylidene) diacetanilide in 60 parts of sulfuric acid (98%) at 0° are added a mixture of 60 parts of sulfuric acid and 14 parts of 70% nitric acid keeping the temperature below 5°. After 45 minutes, the mixture is poured into ice and precipitate filtered off and washed with water until acid free to give 2 parts 4,4'-(hexafluoroisopropylidene)-bis-(2-nitroacetanilide). Recrystallization from petroleum ether gives faint yellow crystals M.P. 146–148° C.

*Analysis.*—Calcd. for $C_{19}H_{14}F_6N_4O_6$; C, 44.9; H, 2.7; F, 22.4; N, 11.0. Found: C, 44.7; H, 2.7; F, 22.7; N, 10.8.

EXAMPLE VIII

4,4'-(hexafluoroisopropylidene)bis-(2-nitroaniline)

1.5 parts of 4,4'-(hexafluoroisopropylidene)bis-(2-nitroacetanilide) are dissolved in 50 parts of concentrated sulfuric acid and water added dropwise with stirring until the solution just becomes cloudy. The mixture is then heated at a gentle boil until the solution is clear; further water is then added to cloudiness and the process of boiling and gradual water addition continued for 2 hours. The solution is cooled and drowned in much water (base may be added if necessary) and the precipitated diamine filtered off. Washed acid-free with water, the 4,4'-(hexafluoroisopropylidene)bis-(2-nitroaniline) has M.P. 283–285° C.

*Analysis.*—Calcd. for $C_{15}H_{10}F_6N_4O_4$: C, 42.5; H, 2.36; N, 13.2; F, 26.9. Found: C, 42.1; H, 3.4; N, 13.0; F, 26.8.

EXAMPLE IX

4,4'-(hexafluoroisopropylidene)-bis(phthalic anhydride)

36 parts of 4,4'-(hexafluoroisopropylidene)-bis(o-xylene) are dissolved at 100° C. in a mixture of 500 parts of pyridine and 250 parts water. The solution is refluxed gently for 4 hours while cautiously adding 75 parts potassium permanganate in small portions over the first two hours. The hot solution is filtered and the cake of manganese oxides washed with a hot mixture of 160 parts pyridine and 40 parts water. The filtrate is evaporated to 200 ml. and then added to 50 parts caustic soda in 550 parts water. The solution is boiled in an open vessel and 100 parts potassium permanganate added over one hour. The volume is maintained at 750 ml. by the periodic addition of water. After boiling for a further hour, the solution is cooled somewhat and the excess permanganate destroyed by the cautious addition of a little ethyl alcohol. The mixture is filtered and the cake washed with 200 parts of hot water. The combined filtrate and washings are then evaporated until no residual pyridine can be detected by smell and then acidified to pH 1 with hydrochloric acid. The solution is evaporated to dryness and extracted in a Soxhlet extractor with acetone. The acetone solution is evaporated and 250 parts of xylene added to the crude 4,4'-(hexafluoroisopropylidene)bis(phthalic acid) and the mixture refluxed under a Dean-Stark separator to remove water. When no further water is eliminated the xylene is evaporated and the crude anhydride is purified by sublimation. The 4,4'-(hexafluoroisopropylidene)bis(phthalic anhydride) has melting points from 250–254° C.

The novel compounds of this invention may readily be utilized to prepare high molecular weight polymers by interfacial or solvent polymerization by reacting an aromatic diacid chloride with an aromatic diamine, the acid groups of the diacid chloride and the amine groups of the diamine being meta or para oriented relative to each other, at low temperatures (below 100° C.). These processes are fully described in U.S. Patents Nos. 2,831,834 and 3,063,966.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

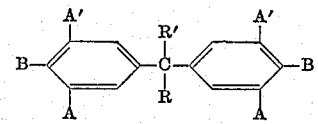

wherein R and R' have the formula $CCl_mF_{3-m}$, $m$ is 0 or 1, said A is selected from the group consisting of H, Cl, Br, $NO_2$, COOH and $NH_2$; said A' is selected from the group consisting of H, Cl and Br; and, said B is selected from the group consisting of $CH_3$, COOH, $NH_2$, $NHCH_3$, $NHC_2H_5$ and $NHC_2H_4CN$, with the proviso that when said A is $NH_2$, said B is selected from the group consisting of $NH_2$, $CH_3$ and COOH, and, with the proviso that when said A is selected from the group consisting of H, Cl, Br, $NO_2$ and COOH, said B is selected from the group consisting of $NH_2$, COOH, $NHC_3$, $NHC_2H_5$ and $NHC_2H_4CN$.

2. 4,4'-(hexafluoroisopropylidene)-dianiline.

3. 4,4'-(hexafluoroisopropylidene)-bis(phthalic anhydride).

4. 4,4'-(hexafluoroisopropylidene)-dibenzoic acid.

References Cited by the Examiner

Fugua et al., Chemistry and Industry (London), vol. 39, 1963, pp. 1591–1592. TP 1 S63.

Riemschneider, Zur Kenntnis Der Kontakt, 1947, p. 151, SB 951 R54.

ALEX MAZEL, *Primary Examiner.*

HENRY R. JILES, *Examiner.*

JAMES H. TURNIPSEED, *Assistant Examiner.*